(12) United States Patent
Menashe (10) Patent No.: US 7,216,118 B2
(45) Date of Patent: May 8, 2007

(54) RESILIENT DOCUMENT QUERIES

(75) Inventor: Gilad Menashe, Netanya (IL)

(73) Assignee: SAP Portals Israel Ltd., Raanana (IL)

( * ) Notice: Subject to any disclaimer, the term of this patent is extended or adjusted under 35 U.S.C. 154(b) by 365 days.

(21) Appl. No.: 10/021,306

(22) Filed: Oct. 29, 2001

(65) Prior Publication Data

US 2003/0088550 A1 May 8, 2003

(51) Int. Cl.
*G06F 17/30* (2006.01)
(52) U.S. Cl. .................................................. 707/3
(58) Field of Classification Search .............. 707/1, 707/4, 5, 513, 2, 3, 10, 200; 709/203, 224
See application file for complete search history.

(56) References Cited

U.S. PATENT DOCUMENTS

2001/0044810 A1* 11/2001 Timmons .................... 707/513
2002/0156778 A1* 10/2002 Beeferman .................. 707/5
2003/0028512 A1* 2/2003 Stensmo ..................... 707/1

OTHER PUBLICATIONS

Chang, George J. S. et al.; "A Graphical Environment for Change Detection in Structured Documents"; 1997, *Computer Software and Applications Conference*, pp. 536-541.

Lee, Yong Kyu et al.; "Index Structures for Structured Documents"; 1996, *Proceedings of the 1st ACM International Conference on Digital Libraries*, pp. 91-99.

Liu, Ling et al.; "XWRAP: An XML-enabled Wrapper Construction System for Web Information Sources"; 2000, *Proceedings of the 16th International Conference of IEEE Computer Society*, pp. 611-621.

* cited by examiner

*Primary Examiner*—Etienne P. LeRoux
(74) *Attorney, Agent, or Firm*—Philip H. Albert; Townsend and Townsend and Crew, LLP (57) ABSTRACT

A resilient query is provided that is used to search for a desired element in a similar document. A set of stable elements is predetermined or chosen and an original sequence of elements representing an ordered list of elements in an original document is generated. The original sequence of elements is then used in searching for a desired element in a similar document. A second sequence of elements is built from the similar document and compared to the original sequence. From the comparison, the desired element is determined.

38 Claims, 11 Drawing Sheets

FIG. 1

```
<html>
    <body>
        <table>
            <tr><td>Welcome</td></tr>
        <table>
         <form action="run.jsp">
            <table>
                <tr><td>Einstein's formula</td></tr>
                <tr><td><div>e=mc^2</div></td></tr>
            <table>
        </form>
        <table>
            <tr><td>Hello</td></tr>
        <table>
    </body>
</html>
```

URL: http:// . . .
Sequence: TF_I_DT
Position: 3
T: tag=TABLE
F: tag=FORM
D: tag=DIV

```
<html>
    <body>
        <h1>This is a new element</h1>
        <table>
            <tr><td>Welcome</td></tr>
        <table>
        <form action="run.jsp">
            <table>
                <tr><td>Pythagoras' formula</td></tr>
                <tr><td><div>a^2+b^2=c^2</div></td></tr>
            <table>
        </form>
        <table>
            <tr><td>Hello</td></tr>
        <table>
    </body>
</html>
```

FIG. 6

```
<html>
    <body>
        <table>
            <tr><td>Hello</td></tr>
        <table>
        <div>This is a new element</hl>
        <table>
            <tr><td>Welcome</td></tr>
        <table>
        <form action="run.jsp">
            <table>
                <tr><td>Pythagoras' formula</td></tr>
                <tr><td><div>a^2+b^2=c^2</div></td></tr>
            <table>
        </form>
    </body>
</html>
```

FIG. 7

URL: http:// . . .
Sequence: TDTFID
Position: 5
T: tag=TABLE
F: tag=FORM
D: tag=DIV

FIG. 8

```
<html>
    <body>
        <form action="run.jsp">
            <div>Stable Text</div>
        </form>
        <table>
            <tr><td>Welcome</td></tr>
        <table>
        <form action="run.jsp">
            <table>
                <tr><td>Einstein's formula</td></tr>
                <tr><td><div>e=mc^2</div></td></tr>
            <table>
        </form>
        <table>
            <tr><td>Hello</td></tr>
        <table>
    <body>
</html>
```

FIG. 9

URL: http:// . . .
Sequence: FQTZ<u>T</u>DT
Position: 5
T: tag=TABLE
F: tag=FORM
D tag=DIV
Z: tag=FORM; Action=run.jsp
Q: tag=DIV; text=Stable Text

FIG. 10

URL: http://...
Sequence: TFTDT
Position: 3
XPath: tr[position () =1]/t d
T: tag=TABLE
F: tag=FORM
D: tag=DIV

FIG. 11

RESILIENT DOCUMENT QUERIES

BACKGROUND OF THE INVENTION

The present invention generally relates to searching documents and more specifically to resiliently searching for a desired element in a document.

With the advent of the internetwork of networks generally referred to as the Internet, the amount of information ("content") and the number of web pages on which the content is found has increased enormously. The Internet has allowed users access to information that was previously inaccessible or hard to find. However, the increase in the number of web pages makes finding content more difficult.

One way a user system may easily access content from a variety of web pages is to create a portal page, where a user's desired content is aggregated from various web pages to their portal page. Typically, a user desires a snippet of content from a variety of web pages. A portal gathers the desired content from the web pages and displays the aggregated content in the portal page. Thus, multiple web pages do not need to be accessed and users may just access their portal page to receive the desired content.

The task of aggregating content the user desires is difficult because of the ephemeral nature of the Internet. Web pages may be static information stored on a web server and served upon request or may be dynamic pages that are generated in whole or part in response to a request for the page. Whether static or dynamic, a given web page may change from time to time, such as daily or in real-time. For any given web page, the content, structure, or layout may change, often at irregular times and normally without notice to subsequent requestors of the page, thus making automated querying of the pages difficult.

In one example, a user may desire a snippet of a page that shows the top news stories of the day, but the layout of the page including the snippet and the location of the snippet within that page may change over time. Typically, search methods that aggregate snippets of content rely heavily on the hierarchical structure of software code used for developing the web pages. Thus, relatively small changes in the web page will cause a search query to fail and thus, the desired snippet will not be found. Additionally, defining a search query required to gather the snippets of content may become complex and hard to define, and may require knowledge of the code structure for the web page. Thus, search methods used by portals may not be able to define what content is desired for a user. Accordingly, the portal may not be able to display a user's desired content.

BRIEF SUMMARY OF THE INVENTION

In one embodiment, a resilient query is provided that is used to search for a desired element in a similar document. A set of stable elements is predetermined or chosen and an original sequence of elements representing an ordered list of elements in an original document is generated. The original sequence of elements is then used in searching for a desired element in a similar document. A second sequence of elements is built from the similar document and compared to the original sequence. From the comparison, the desired element is determined.

In one embodiment, a method for searching for a desired element in a document using a first sequence of elements from a related document is provided. The document is related by an expected similarity and the first sequence of elements represents an ordered list of elements where each element is from a predetermined set of elements. The method comprises: building a second sequence of elements from the document, wherein the second sequence of elements represents an ordered list of elements where each element is from the predetermined set of elements; generating one or more search queries from the first sequence of elements; comparing the second sequence of elements with the one or more search queries to produce one or more comparison results; and determining the desired element in the document from the one or more comparison results.

In another embodiment, a method for searching for a desired element found in a first document in a second document using a predetermined set of stable elements is provided. The method comprises: building a first sequence of stable elements from the first document, wherein the first sequence of stable elements represents an ordered list of elements where each element is from the predetermined set of stable elements; building a second sequence of stable elements from the second document, wherein the second sequence of stable elements represents an ordered list of elements where each element is from the predetermined set of stable elements; generating one or more search queries from the first string of stable elements; comparing the second sequence of elements with the one or more search queries to produce one or more comparison results; and determining the desired element in the second document from the one or more comparison results.

Additionally, in yet another embodiment, a user interface is provided to facilitate searching for a desired element. The method comprises selecting the desired element in the first document using the user interface; and determining a default set of stable elements based on the selected desired element.

A further understanding of the nature and advantages of the invention herein may be realized by reference of the remaining portions in the specifications and the attached drawings.

DETAILED DESCRIPTION OF THE INVENTION

In one embodiment of the present invention, a resilient query definition is generated and subsequently used in searching for a desired element in a document. The desired element is located in the document using the resilient query definition, which is resistant to changes in the structure of a changing document. Additionally, in another embodiment, a user interface is provided to facilitate creating a resilient query definition and searching for a desired element in a document.

The preferred embodiment is described herein and shown in the figures as an embodiment of a computer system running the Macintosh® operating system on a Macintosh® computer manufactured by Apple Computer, of Cupertino, Calif. and running a Web browser where the computer is coupled to the global internetwork of networks known as the "Internet" using a TCP/IP (Transport Control Protocol/Internet Protocol) interface. However, it should be noted that other computers, operating systems and networks are ready equivalents for those elements.

Figure 1:
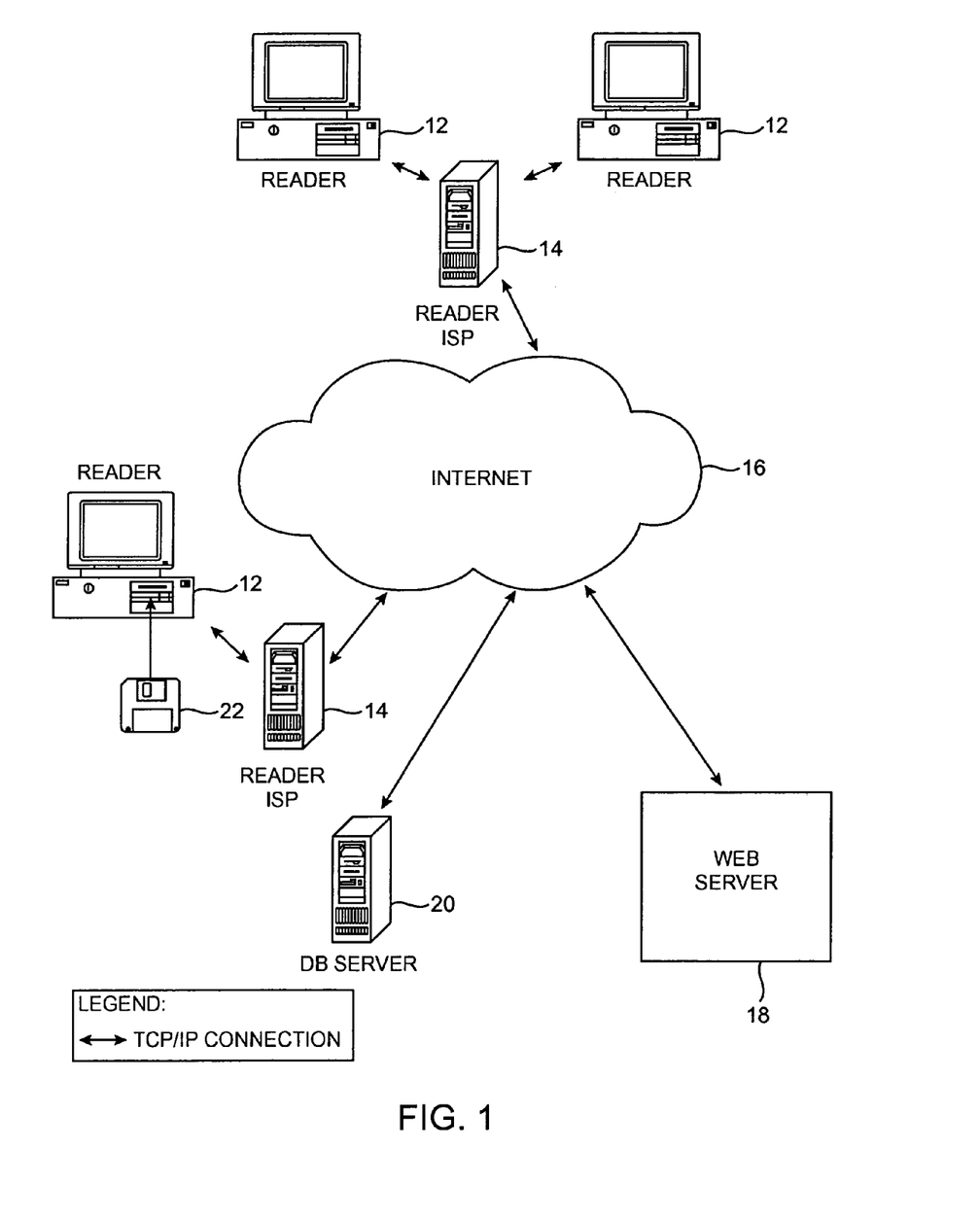
FIG. 1 is a schematic diagram of a network over which an embodiment of the present invention might be used.

FIG. 1 is a schematic of a network over which an embodiment of the invention might operate. To access content, a reader 12 connects to a reader ISP (Internet Service Provider) 14, which in turn connects reader 12 to the Internet 16 as is well known in the art. Other network connections are also possible. Also shown connected to Internet 16 in addition to readers 12 and reader ISP's 14, are a Web server 18, and a database (DB) server 20. Readers 12 are also referred to herein as "browsers" because they can be used by a user to browse the Web. Of course, readers 12 could also be machines totally controlled by programs acting as users as opposed to being controlled by human users. One reader 12 is shown with a client-side program 22 loaded thereon from a magnetic media. In one embodiment, client-side program 22 provides the novel functionality described below.

Although not shown, readers 12 include graphical displays and input devices such as a mouse and/or keyboard. As is well known in the art of user interfaces, the input devices can be used to manipulate a cursor, such as a mouse cursor, on the graphical display to select screen elements.

In one embodiment of the present invention, a desired element in a document may be located using a resilient query definition. In one embodiment, the document includes elements of a software language, such as HyperText Markup Language (HTML) or Extensible Markup Language (XML). The document of elements may produce a web page that a user typically sees on the Internet.

In one embodiment, elements are characters, words, symbols, etc. that are part of the software language used to develop the web page. For example, elements are tags in an HTML code. Some elements in the document may be classified as stable or desired. A stable element is an element that is unlikely to be removed (or added) over time when it appears in a document. However, it will be understood that any element may be a stable element. A desired element may be any element that is desired by a user system for a user. A desired element may be a stable element; however, the desired element may not be stable and an unstable desired element may be located in a method described hereinafter.

For discussions purposes, the following description assumes the document is an HTML code that produces a web page; however, it will be understood that other software languages may be used and it is not intended to limit the present invention to just HTML documents.

The resilient query definition may be a sequence of elements representing an ordered list of elements in the document. The query definition is resilient in that it may be used to search documents that change over time. Thus, the query definition is resilient to changes in the document.

Figure 2:
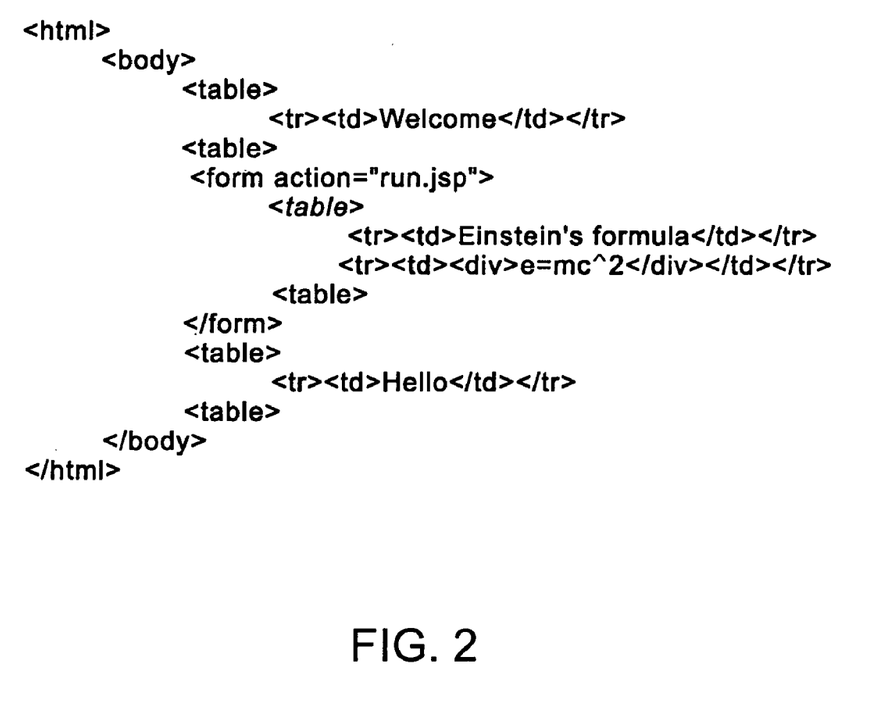
FIG. 2 is an embodiment of a document of HTML code.

FIG. 2 represents a possible HTML document according to one embodiment. In the HTML document, stable elements are boldfaced and a desired element (a table element) has been italicized. The HTML code includes a number of elements, such as tags. Tags are commands that are written between less than (<) and greater than (>) signs. Generally, tags are represented by a start tag and end tag. For example, the first TABLE element is represented by a start TABLE element on line 3 and an end TABLE element on line 5. For discussion purposes, the start elements are the elements that are referenced in a query definition; however, the end elements are optional or inferred from context.

Composing the Resilient Query Definition

Figure 3:
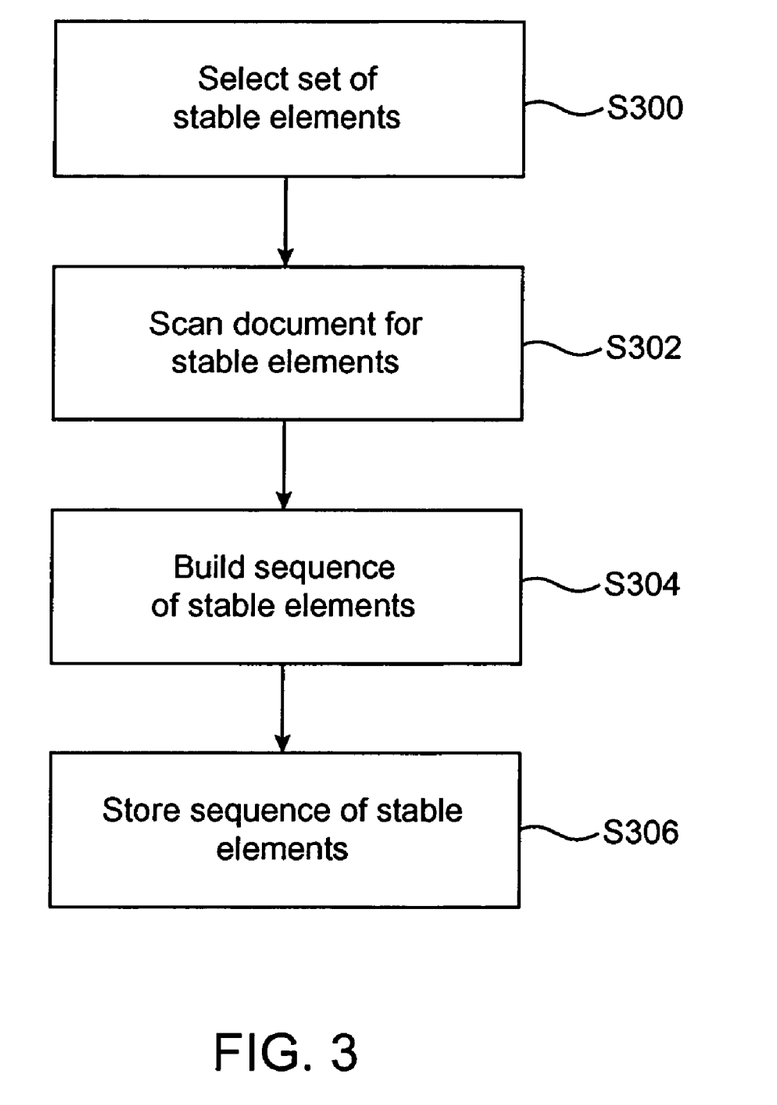
FIG. 3 illustrates a method for composing a resilient query definition according to one embodiment.

FIG. 3 illustrates a method for composing a resilient query definition related to a given document. In step S300, a set of stable elements are selected from the document. The stable elements may be, for example, a predetermined set of stable elements or a set of stable elements that a user has selected. Preferably, a set of stable elements includes elements that will be unlikely to be removed or added in HTML code for a web page that includes changing content. However, a set of stable elements may be any set of elements either located in the document or a set of elements known in the art that may or may not be located in the document. For example, experience may show that most web pages have a constant number of TABLE, FORM, and DIV tags, and these tags are usually stable, even for pages with frequently changing content.

Once the set of stable elements has been selected, the document is then scanned for the stable elements (step S302). The document may be scanned using any traversal scheme. For example, an HTML document is typically arranged in a document tree where elements are arranged in a parent/child structure. Accordingly, an in-order traversal where a parent is traversed and then the children of the parent are traversed may be used. The traversal builds a sequence of stable elements from the document at the time of the traversal (step S304). For example, each time a stable element in the document tree is encountered, a character that represents that element may be appended to a string of characters. Assuming the set of stable elements is {TABLE, FORM, and DIV}; and the elements are represented by T, F, and D respectively, a sequence of stable elements for the above HTML document is "TFTDT", with the desired element underlined. The sequence represents an ordered list of stable elements in the document. Although the set of stable elements is represented by letters, a person skilled in the art will appreciate other schemas for representing stable elements, such as using integers, symbols, words, and the like.

Figure 4:
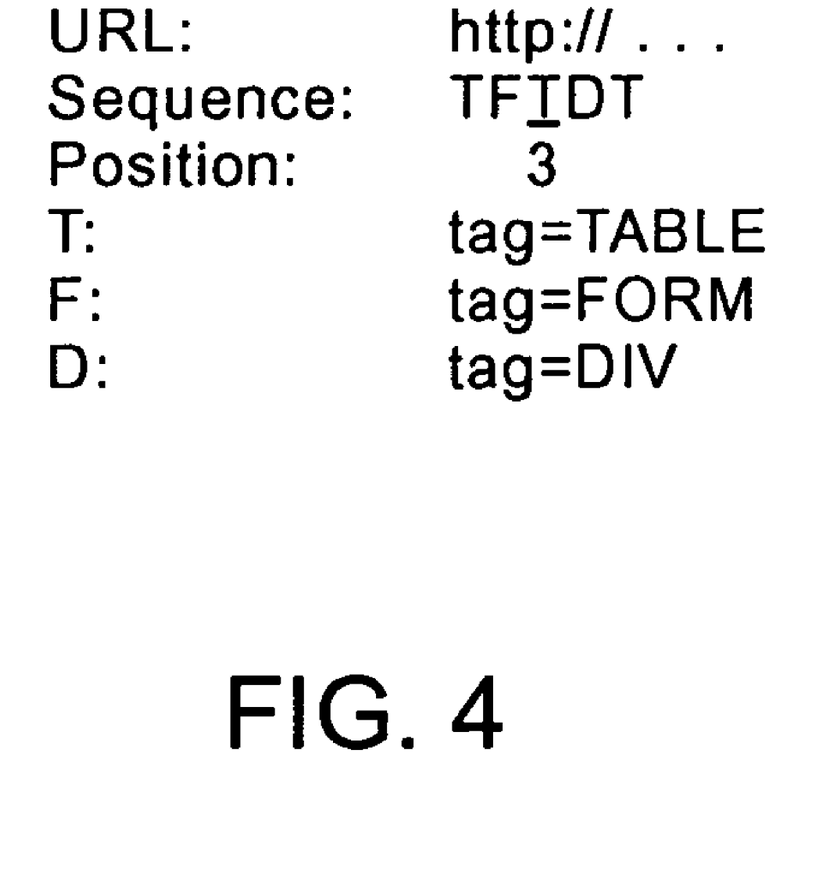
FIG. 4 illustrates an embodiment of a resilient query definition that might be stored.

In one embodiment, the sequence of stable elements is stored for future use (step S306). Additionally, the sequence of stable elements may stored as part of a resilient query definition as illustrated in FIG. 4. The resilient query definition may be stored in a computer medium, such as web server 18, DB server 20, client-side program 22, reader 14, or reader 12.

As shown, the definition includes the location of the document, such as a URL of a web page, the sequence of stable elements represented by the string of characters (sequence), the position of the desired element (position), and definitions of stable elements in the set of stable elements (T, F, and D).

Searching for the Desired Element

In one embodiment, the desired element is searched for and retrieved at a later time from a similar document. The similar document may include software code for a web page where the layout of the content within the page is expected to remain more or less the same. In the case of actively updated web pages, content may change over time, but the location of specific content on the page most likely will not drastically change. For example, current news headlines may change every hour, but their location on the page will most likely not. Thus, a similar HTML page is new in that the page includes new content; however, a similar document will most likely will look similar to the layout of the initial document. For example, a similar document may be HTML code for a similar web page as compared to the HTML code for the web page shown in FIG. 2. Although the term "similar document" is used herein for discussion purposes, it will be understood that a similar document may be any document and no degree of similarity is necessary for searching for a desired element.

Figure 5:
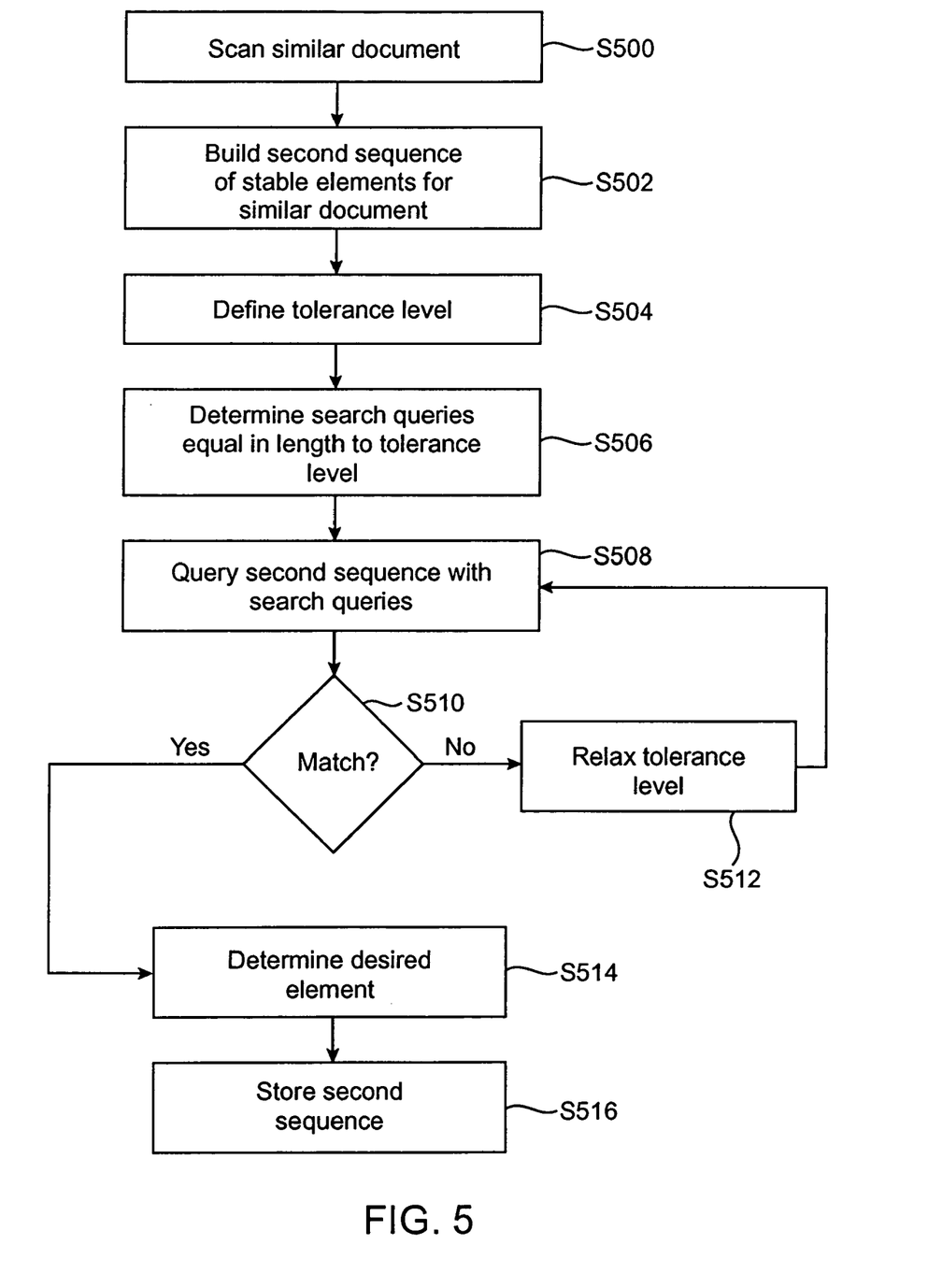
FIG. 5 illustrates a method for searching for the desired element according to one embodiment.

FIG. 5 illustrates a method for searching for the desired element according to one embodiment. In step S500, the similar document is scanned for stable elements from the set of stable elements at a different time from when the original document was scanned. In step S502, a second sequence of stable elements is built from the traversal of the similar document. Using the set of stable elements stored as part of the query definition, the similar document is traversed and a second sequence of stable elements is built for the similar document. The sequence of stable elements represents an ordered list of stable elements for the similar document.

Figure 6:
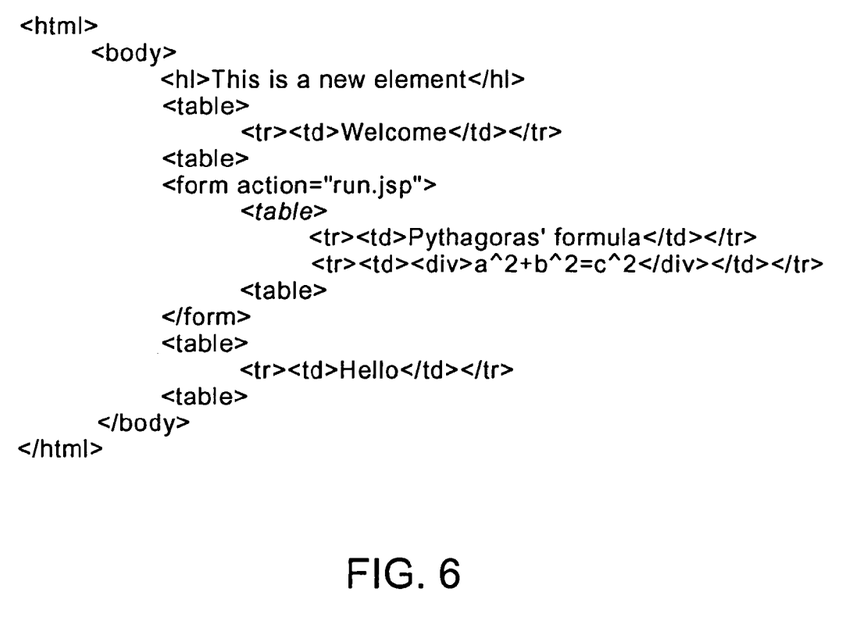
FIG. 6 is an embodiment of a similar document of HTML code.

In one example, the second sequence of stable elements equals the original sequence of stable elements when the two sequences are compared. Then, the desired element is located by its position in the first or second sequence of elements. For example, a similar document may be illustrated as shown in FIG. 6.

As shown, the code in the similar document includes the same number of stable elements. Additionally, the stable elements are arranged in the same hierarchy as the original document. Although the first HL element is a new element in the similar document, the new element was not stable and therefore, the second sequence of elements from of the document remained the same. The desired element or second table element (third stable element) is determined from the first and/or second sequence of stable elements.

In another example, a similar page may include new stable elements or have some of the old stable elements disappear. Thus, the sequence of stable elements for the similar page changes. For example, another similar HTML document may be illustrated as shown in FIG. 7.

Figure 7:
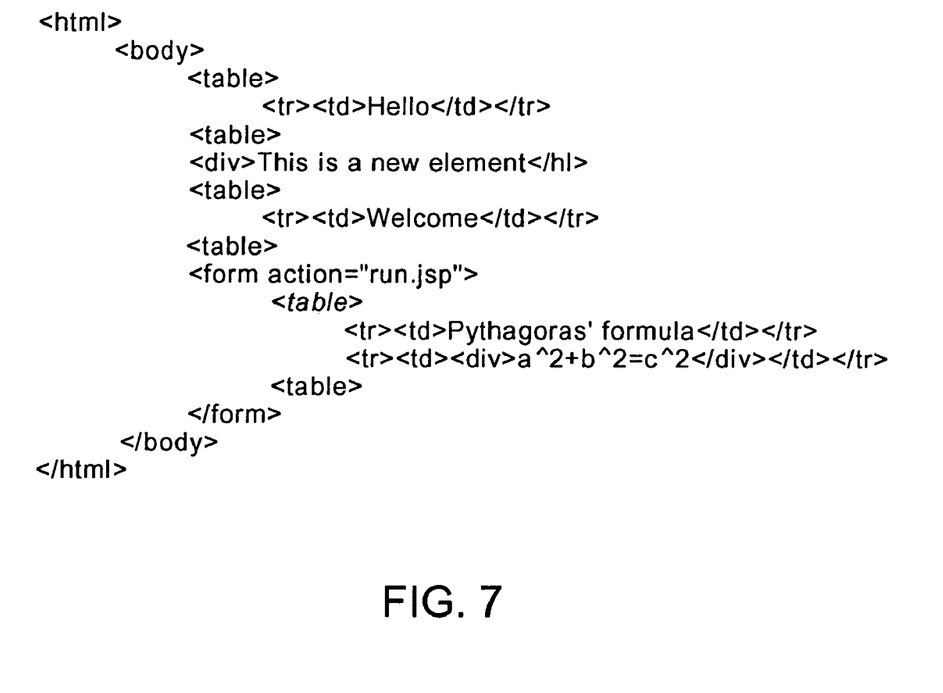
FIG. 7 is another embodiment of a similar document of HTML code.

After the similar document in FIG. 7 is traversed, the second sequence of elements is "TDTFTD", with the desired element underlined. Because the similar document has changed from the original page, the sequences for the two pages will not be equal. Thus, a method for determining the desired element in the second sequence of elements is used.

Referring back to FIG. 5, in one embodiment, a tolerance level is set that defines the length of a sub-string (step S504). Next, search queries are generated from the original sequence of elements that are of a length equal to the tolerance level (step S506). The tolerance level may be set at a default number and then relaxed until the desired element is located. Also, the tolerance level may be set arbitrarily by a user or set by factors, such as the length of the original sequence of elements. For example, if the original sequence of elements is ten characters long, the default tolerance level may be half the length or five characters long. Other factors may include the diversity of the stable tags in the sequence of elements. For example, if ninety percent of the stable tags in the sequence of elements are TABLE elements, the tolerance level will preferably be longer.

The original sequence is "TFTDT", and from FIG. 7, the new sequence is "TDTFTD". If the tolerance level is initialized to five, a sub-string of the length of five for the original sequence of elements is determined. In this case, the original string is five characters long and the entire string is used to query the second sequence of elements (step S508). The method then determines if a search query matches the second sequence of elements (step S510). In this case, the search query fails to find an exact match because the entire string is not found in the second sequence of elements. Therefore, the tolerance level may be a relaxed to a lower number, such as four (step S512).

The method reiterates to step S506, where new search queries are generated. At the tolerance level of four, two possible sub-strings may be searched for: "FTDT" and "TFTD". The first string is not found in the new sequence, but the second string is found. Once the second string is found, the desired element in the similar page is located by matching the desired element in the search query to the corresponding element in the second sequence of stable elements (step S514).

In one embodiment, a sub-string that is more centered with respect to the desired element is preferred. An example sequence and search sub-strings in order of preferences illustrated as:

```
Original Sequence:        TFFTDDTTDTTDDFFTT
Search strings (t = 5):        TTDTT

DTTDT

TDTTD

DDTTD

DTTDD
```

Figure 8:
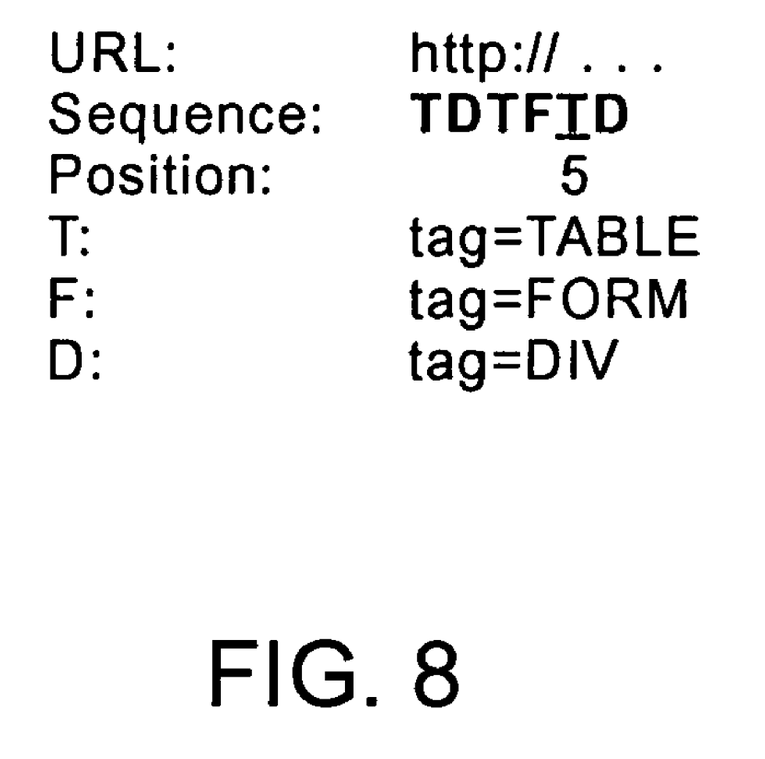
FIG. 8 illustrates another embodiment of a resilient query definition that might be stored for the similar document of FIG. 7.

The initial query definition is resilient to changes in the structure of a document. A query definition is created in a way that minimizes dependencies and enables the recovery of desired elements in cases where documents change over time. Additionally, the new sequence may be stored when the search query is successfully determined (step S516). Thus, as a document changes over time, successive sequences of stable elements may be kept and desired elements more accurately retrieved because sequences are kept up to date for live web pages. Using the above example, the new stored query definition may be illustrated as (with changes in boldface) in FIG. 8.

In one embodiment, the new stored query definition may be used to search for desired elements in other similar documents. Additionally, all prior query definitions may be used in searching. If prior query definitions are used, the method may use the newest match or may use a heuristic algorithm to determine which resilient query definition locates the desired element most accurately. Thus, the method may be used for additional similar web pages over time.

When searching for the search queries in the new sequence, it is possible that searching for a sub-string will result in more than one match or no matches at all. In the case of more than one match, heuristics may be used to determine the desired element. For example, additional query searches using other sub-strings of the same length (tolerance) may be run until one of the queries returns just one match. Additionally, a counter for the number of matches per element may be kept and the search query with the highest number of matches per element is selected for determining the desired element. Also, considering all of the matches from the search queries, the search query with an index (position of the desired element in the new sequence) closest to position of the desired element in the original sequence may be chosen. A combination of two or more of the above methods may be used and a person of skill in the art will appreciate other methods for resolving multiple matches.

In the case where no matches are found, a fuzzy search may be performed in one embodiment. Using a fuzzy search, the sub-string of the original sequence does not have to be found in its entirety in the new sequence. While finding an exact match in the new sequence may produce more accurate results, using an exact search method is more likely to fail in cases where a change occurs close to the desired element and especially if it happens on both sides of the desired element. In one example, an original and new sequence is illustrated as:

```
Original Sequence:      TFTTFTDTFDTTD

New Sequence:           TFTTFT T DTTD
```

As shown, a DIV element and a FORM element have been removed from the new sequence. An exact match method produces the wrong result because the boldface DT and the new sequence will be found when the tolerance is set to two and the TABLE element in the DT string will be chosen as the desired element. However, that TABLE element is not the desired element.

Instead, in an alternative embodiment, the tolerance level may be set at a higher level, such as seven. The method then searches for the string "FTDTFDT" or the best match thereof (allowing for certain characters to be missing or changed). The best match is chosen and the desired element determined from that match. Additionally, other search queries with the same tolerance level may be run and the best match of the multiple search queries may be chosen in determining the desired element. For example, the search query result with the greatest number of matching characters in the same position or the search query result with the greatest number of matching characters is chosen as the best match.

Figure 9:
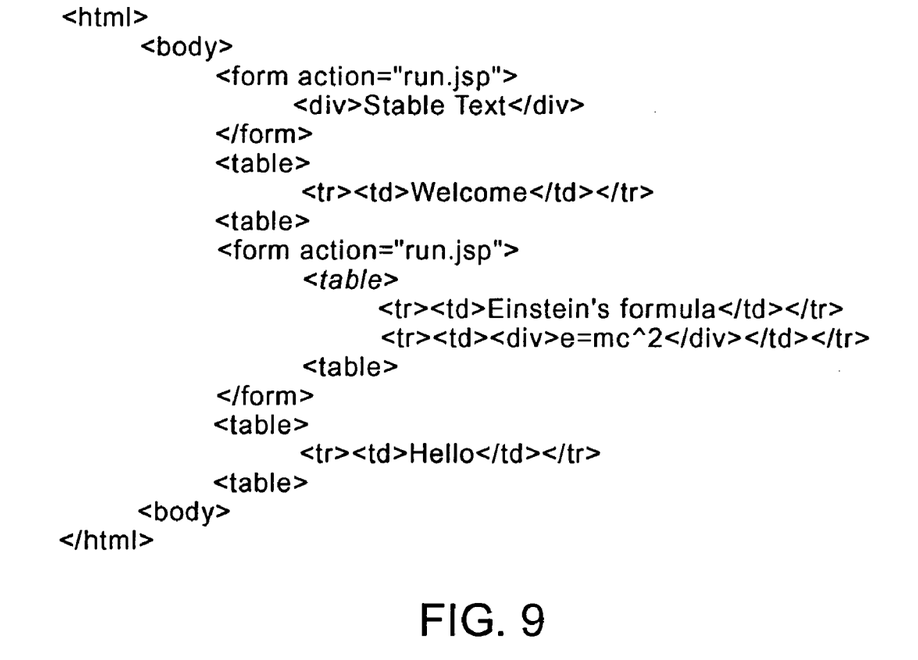
FIG. 9 is another embodiment of a similar document of HTML code.

In one embodiment, a query definition may be further constrained in order to improve the accuracy of the search for the stable and desired elements. For example, elements are further constrained by associating attributes to them. Considering the code in FIG. 9, a FORM tag whose ACTION attribute equals "run.jsp" and the DIV tag whose attribute equals the text "Stable Text" may be constrained by associating the attributes to the elements.

The constrained query definition causes a search for the FORM tag with its action attribute and the DIV tag with its text attribute in a new sequence. Using the constrained attributes, a desired element may be located more accurately because the search is narrowed using the attributes.

Figure 10:
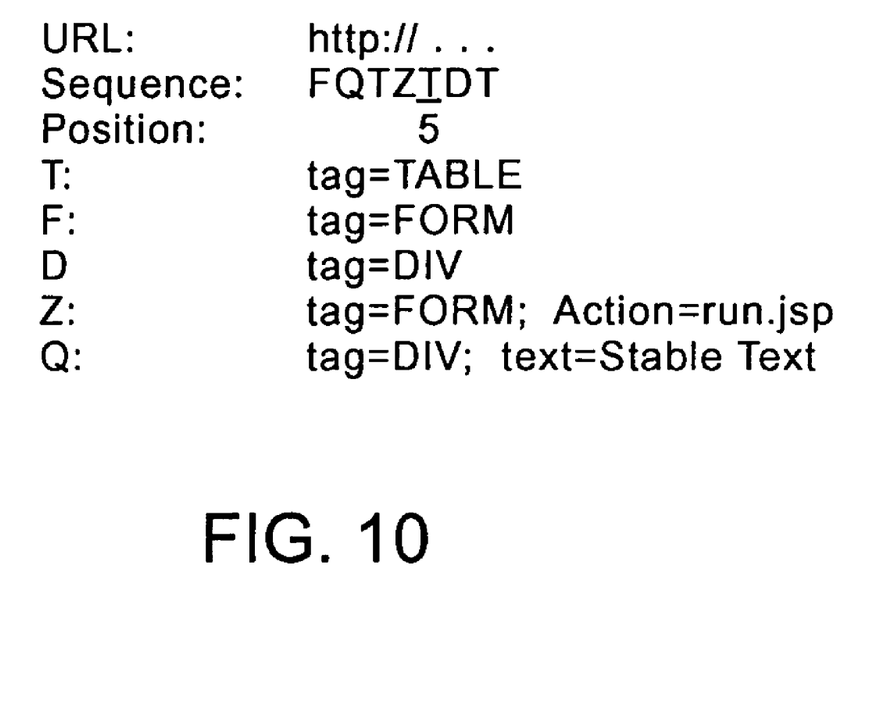
FIG. 10 illustrates another embodiment of a resilient query definition that might be stored for the similar document of FIG. 9.

In one embodiment, the query definition in the above example may be illustrated as shown in FIG. 10.

The Z entry in FIG. 10 indicates that a FORM element includes the action attribute "run.jsp" and the letter Q indicates that the DIV element includes the text attribute "Stable Text".

In another embodiment, the desired element is not defined as stable and does not appear in the sequence. Therefore, the desired element may not be located without information in addition to a set of stable elements. In one embodiment, the resilient query includes a base desired element and a target desired element. The base desired element is a stable element, preferably the stable element closest to the desired element, and the target desired element is the desired element itself. A search query may search for the base desired element and then rely on other methods for describing the relationship between the base desired element and the target desired element.

For example, in the document shown in FIG. 2, the target desired element is the TD element that includes the words "Einstein's Formula."

Figure 11:
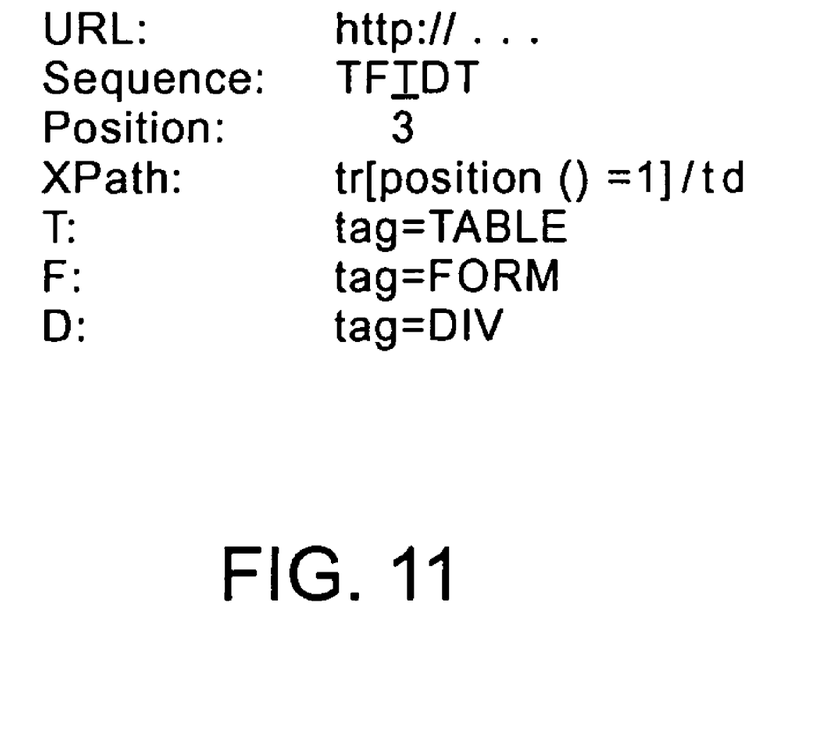
FIG. 11 illustrates another embodiment of a resilient query definition using an XPATH command that might be stored.

A query may be used to describe the relationship between the target desired element and the base stable element. For example, an XPATH query is used to describe the relationship. XPATH is a language that uses a tree hierarchy to locate elements. For example, an XPATH query starts with an element, finds the first child of the element, the child of the first child, etc. XPATH is known in the art and need not be described further. An example query definition is shown in FIG. 11.

As shown, the query definition includes an XPATH command that is executed when the base desired element (second table element) is located. The XPATH command starts from the base desired element and locates the first TR element. The command then locates the TR element's child of the type TD. The XPATH command introduces a dependency on the hierarchical structure of the document; however, the dependency is limited to the elements located between the target stable element and base element. Thus, the dependency does not depend on the structure of the whole document.

User Interface

A user interface is provided for composing the resilient query definition and facilitating a subsequent search for desired elements. In one embodiment, the user interface allows an author of the resilient query to choose a set of stable elements based on the user's knowledge of the layout of the document the query is going to be run against and its expected evolution pattern. For example, a user may choose from a sequence of possible stable elements or input a set of stable elements that will be used to compose a resilient query definition. The user interface may then be used to initiate a search for a desired element.

Additionally, in another embodiment, the user interface provides for the resilient searching for a desired element without any knowledge of the HTML code for a web page. The user interface displays a web page that includes pieces of content that correspond to elements of HTML code. One or more of the pieces of content may be selected as a desired element and the user interface creates a sequence of stable elements. In one example, a predetermined "default" set of stable elements is used. In one embodiment, the default set is based on an analysis of an "average" page and using the elements that produce the best results on average. The default set is used to create a resilient query and the user interface may then be used to initiate a search for a desired element. In another embodiment, a set of stable elements is defined based on the one or more pieces of content selected.

Thus, users without knowledge of the page layout and its expected evolution may define resilient queries. A user does not need working knowledge of the layout on the page or any software code. The user selects the desired element and default stable elements are used that most likely produce the best results. Accordingly, very minimal information is required from the user to produce a resilient query that is resilient to changes in a document.

In another embodiment, a preliminary set of elements for a page may be produced by the user interface. Stable elements are then selected from the preliminary set and the selected elements are used as the set of stable elements. Additionally, different choices of default sets of stable elements may be shown. The user interface is then used to select among the different sequences. Once the set of stable elements has been chosen, the user interface facilitates composing the resilient query definition and searching for the desired element.

The above description is illustrative but not restrictive. Many variations of the invention will become apparent to those skilled in the art upon review of the disclosure. For example, multiple desired elements may be searched for in one or more documents. The scope of the invention should, therefore, be determined not with reference to the above description, but instead should be determined with reference to the pending claims along with their full scope or equivalents.

What is claimed is:

1. A method for searching for a desired element found in a first document and in a second document using a predetermined set of stable elements selected from among a set of elements including stable elements and unstable elements, the method comprising:
   (a) building a first sequence of stable elements from the first document, wherein the first sequence of stable elements represents an ordered list of elements where each element is from the predetermined set of stable elements, wherein the stable elements are derived from the set of elements that include the stable elements and the unstable elements;
   (b) building a second sequence of stable elements from the second document, wherein the second sequence of stable elements represents an ordered list of elements where each element is from the predetermined set of stable elements;
   (c) generating one or more search queries from the first sequence of stable elements;
   (d) searching the second document by comparing the second sequence of elements with the one or more search queries to produce one or more comparison results; and
   (e) determining the desired element in the second document from the one or more comparison results.

2. The method of claim 1, wherein generating one or more search queries from the first sequence of elements comprises determining a tolerance level and using the tolerance level to determine the one or more search queries.

3. The method of claim 2, wherein generating one or more search queries from the first sequence of elements comprises building the one or more search queries of a length equal to the tolerance level.

4. The method of claim 3, further comprising:
   determining a new tolerance level if the desired element cannot be determined from the one or more comparison results; and generating the one or more search queries of a length equal to the new tolerance level.

5. The method of claim 1, further comprising performing at least steps (c), (d), and (e) a plurality of times to determine the desired element.

6. The method of claim 1, wherein determining the desired element from one or more query results comprises determining the desired element from an exact match between a search query and the second sequence of stable elements.

7. The method of claim 1, wherein determining the desired element from one or more query results comprises determining a best match between one or more search queries and the second sequence of stable elements.

8. The method of claim 7, wherein determining the best match between the search query and the second sequence of stable elements comprises counting a number of matches per element for each search query and the second sequence of stable elements.

9. The method of claim 8, wherein determining the best match between the search query and the second sequence of stable elements comprises choosing the search query with a highest number of matches as the best match.

10. The method of claim 7, wherein each search query is associated with a search query position representing a relative position of the desired element in the search query to the desired element in the related document and wherein determining the best match between the search query and the second sequence of stable elements comprises choosing a search query having a search query position closest to a position of the desired element in the second sequence of stable elements as the best match.

11. The method of claim 1, further comprising constraining a stable element in the predetermined set of stable elements with an attribute associated with the stable element.

12. The method of claim 11, wherein building a first sequence of stable elements comprises searching for the constrained stable element and the attribute associated with the constrained stable element in the first document.

13. The method of claim 11, wherein building a second sequence of stable elements comprises searching for the constrained stable element and the attribute associated with the constrained stable element in the second document.

14. The method of claim 1, further comprising searching for a target desired element based on the target desired element's relationship with the desired element.

15. The method of claim 1, further comprising storing the second sequence of stable elements.

16. The method of claim 1, wherein the first sequence of stable elements is a sequence of characters representing elements in the predetermined set of stable elements.

17. The method of claim 1, wherein the first and second documents comprise an HTML document.

18. The method of claim 1, further comprising a process to evaluate relative likelihoods of the set of stable elements producing best results, wherein the process to evaluate relative likelihoods is done using user input for selecting elements.

19. The method of claim 1, further comprising a process to evaluate relative likelihoods of the set of stable elements producing best results, wherein the process to evaluate relative likelihoods is done by a computer analysis of a plurality of documents.

20. A method for searching for a desired element found in a first document in a second document using a user interface, the method comprising:

selecting the desired element in the first document using the user interface;

determining a set of stable elements, from among a set of elements including stable elements and unstable elements, based on the selected desired element;

building a first sequence of stable elements from the first document, wherein the first sequence of stable elements represents an ordered list of elements where each element is from the set of stable elements;

building a second sequence of stable elements from the second document, wherein the second sequence of stable elements represents an ordered list of elements where each element is from the set of stable elements;

determining one or more search queries from the first sequence of elements;

searching the second document by comparing the second sequence of elements with the one or more search queries to produce one or more comparison results; and determining the desired element in the second document from one or more comparison results.

21. The method of claim 20, wherein determining a set of stable elements comprises using a default set of stable elements.

22. The method of claim 20, wherein determining a set of stable elements comprises choosing elements using the user interface to determine the set of stable elements.

23. The method of claim 20, further comprising a process to evaluate relative likelihoods of the set of stable elements producing best results, wherein the process to evaluate relative likelihoods is done by a computer analysis of a plurality of documents.

24. In a computer system that handles documents wherein a first document known to contain a desired element also contains a first plurality of elements ordered into a first sequence of elements, a method of searching for the desired element in a second document expected to be similar to the first document comprising:
  (a) obtaining an indication of the desired element and its position within the first sequence of elements in the first document;
  (b) building a second sequence of elements from the second document representing a second plurality of elements found in the second document ordered according to the second sequence of elements, wherein the second sequence of elements are each members of a predetermined set of stable elements selected from among a set of elements including stable elements and unstable elements;
  (c) generating one or more search queries from stable elements among the first sequence of elements;
  (d) searching the second sequence of elements of the second document according to the one or more search queries to produce one or more search results; and
  (e) determining the desired element in the second document from the one or more search results.

25. The method of claim 24, wherein the indication of the desired element includes a position of the desired element within the first sequence of elements and an identification of the desired element from among a set of elements.

26. The method of claim 25, wherein the first and second documents are HTML documents, the set of elements is a set of HTML tags used in documents handled by the computer system, the identification of the desired element is a tag label and the position of the desired element within the first sequence of elements is indicated by ordinal number.

27. The method of claim 24, wherein searching the second sequence of elements comprises comparing the second sequence of elements with the one or more search queries to produce one or more comparison results and using the comparison results in the step of determining.

28. The method of claim 27, wherein the desired element in the second document is determined from an exact match from among the one or more comparison results.

29. The method of claim 27, wherein the desired element in the second document is determined from a best match from among the one or more comparison results.

30. The method of claim 29, wherein the best match is a comparison result having the highest number of matches between a search query and the second sequence of elements.

31. The method of claim 29, wherein the best match is a comparison result having a position of the desired element in the second document closest to the position of the desired element in the first document.

32. The method of claim 24, wherein generating one or more search queries from the first sequence of elements comprises:
  determining a tolerance level representable by an integer;
  building the one or more search queries such that each of the one or more search queries comprises a sequence of elements wherein the number of elements in each sequence is equal to the tolerance level.

33. The method of claim 32, further comprising:
  determining if the desired element cannot be found using the one or more search queries each having a number of elements equal to the tolerance level;
  if the desired element cannot be found, determining a new tolerance level less than the tolerance level; and
  rebuilding the one or more search queries such that each of the one or more search queries comprises a sequence of elements wherein the number of elements in each sequence is equal to the new tolerance level.

34. The method of claim 24, further comprising performing at least steps (c), (d) and (e) a plurality of times to determine the desired element in the second document.

35. The method of claim 24, wherein elements comprise element types and element attributes such that elements with distinct types and/or distinct attributes are distinctly identified in the first sequence of elements and the second sequence of elements and wherein searching comprises searching for matching element types and matching element attributes.

36. The method of claim 24, wherein the set of elements used for the first sequence of elements and the second sequence of elements comprises stable elements, wherein a stable element is an element that is less likely, relative to an unstable element, to be changed in documents.

37. The method of claim 24, further comprising a process to evaluate relative likelihoods of the set of stable elements producing best results, wherein the process to evaluate relative likelihoods is done using user input for selecting elements.

38. The method of claim 24, further comprising a process to evaluate relative likelihoods of the set of stable elements producing best results, wherein the process to evaluate relative likelihoods is done by a computer analysis of a plurality of documents.

* * * * *